United States Patent [19]

Rzeszewski

[11] Patent Number: 4,589,011
[45] Date of Patent: May 13, 1986

[54] SINGLE SIDEBAND MODULATED CHROMINANCE INFORMATION FOR COMPATIBLE HIGH-DEFINITION TELEVISION

[75] Inventor: Theodore S. Rzeszewski, Lombard, Ill.

[73] Assignee: AT&T Bell Laboratories, Murray Hill, N.J.

[21] Appl. No.: 571,117

[22] Filed: Jan. 16, 1984

[51] Int. Cl.[4] ............... H04N 11/06; H04N 11/14; H04N 11/20

[52] U.S. Cl. ..................... 358/12; 358/16; 358/11

[58] Field of Search ............ 358/11, 12, 14, 16

[56] References Cited

U.S. PATENT DOCUMENTS

| | | | |
|---|---|---|---|
| 2,987,617 | 6/1961 | Loughlin | 358/11 X |
| 4,476,484 | 10/1984 | Haskell | 358/11 |
| 4,485,401 | 11/1984 | Tan et al. | 358/12 X |
| 4,520,385 | 5/1985 | Jackson et al. | 358/12 |
| 4,521,803 | 6/1985 | Gittinger | 358/12 |
| 4,543,598 | 9/1985 | Oliphant | 358/11 |

FOREIGN PATENT DOCUMENTS 2101835  1/1983  United Kingdom ............ 358/39

OTHER PUBLICATIONS

"Compatible Systems for High-Quality Television", *SMPTE J.*, R. N. Jackson and M. J. J. C. Annegarn, vol. 92, No. 7, pp. 719–723, Jul. 1983.

"Extended Definition Television with High Picture Quality", *SMPTE J.*, B. Wendland, vol. 92, No. 10, pp. 1028–1035, Oct. 1983.

"The Problems and Promises of High-Definition Television", *IEEE Spectrum*, R. K. Jurgen, vol. 20, No. 12, pp. 46–51, Dec. 1983.

"An Evolutionary Aproach to High Definition Television", in *Proc. 16th Annual SMPTE Television Conference (Tomorrow's Television)*, C. W. Rhodes, pp. 186–197, Feb., 1982.

"A Compatible High Fidelity TV Standard for Satellite Broadcasting", in *Proc. 16th Annual SMPTE Television Conference (Tomorrow's Television)*, T. W. Robson, pp. 218–236, Feb. 1982.

"High Definition Television Systems: Desirable Standards, Signal Forms, and Transmission Systems", *IEEE Trans. Comm.*, T. Fujio, vol. COM-29, No. 12, pp. 1882–1890, Dec., 1981.

*Primary Examiner*—Michael A. Masinick
*Assistant Examiner*—Michael P. Dunnam
*Attorney, Agent, or Firm*—John C. Moran

[57] ABSTRACT

A television system having a fully compatible high-definition signal receivable at conventional resolution by conventional TV receivers without auxiliary apparatus with one TV channel carrying the conventional TV signal while high-frequency luminance and chrominance information is provided in a second TV channel. The high-frequency chrominance information is transmitted as two single sideband signals in the second TV channel. The baseband signal containing the high-frequency luminance components is derived from the lower sideband output of a product modulator whose inputs are taken from an anti-alias filtered camera which produces wideband luminance information and a local oscillator whose frequency is a multiple of the conventional chrominance subcarrier frequency embedded in the conventional baseband signal. The high-frequency chrominance information comprises Q' and I' segments and an encoder circuit is responsive to those segments to initially encode each segment into a pair of double sideband signals and then to suppress lower sideband signals before transmission of the upper sideband signals to the receiver. In addition, the encoder gates a tone burst signal defining the phase of the carrier into the vertical retrace interval. The receiver is responsive to the high-frequency chrominance information represented by the two transmitted single sideband signals to first recreate the missing lower sideband signals by multiplying the transmitted upper sideband signals by twice the carrier frequency thus producing a sum-difference signal. The difference portion of the sum-difference signal is the missing lower sideband signals. After combining the recreated lower sideband signals with the transmitted upper sideband signals, conventional quadrature detection methods are utilized to recover the Q' and I' portions of the high-frequency chrominance information. The receiver uses the tone burst signal in the generation of the carrier phase.

19 Claims, 12 Drawing Figures

SINGLE SIDEBAND MODULATED CHROMINANCE INFORMATION FOR COMPATIBLE HIGH-DEFINITION TELEVISION

CROSS-REFERENCE TO RELATED APPLICATIONS

Concurrently filed herewith and assigned to the same assignee as this application is: T. S. Rzeszewski 3, "Time Multiplexing Chrominance Information for Compatible High-Definition Television", Ser. No. 571,183.

The following U.S. application was filed on Jan. 28, 1983, and assigned to the same assignee as this application: T. S. Rzeszewski 1, "Fully Compatible High-Definition Television", Ser. No. 462,065.

TECHNICAL FIELD

This invention relates to a system for improving television picture quality and particularly to video signal composition and processing facilities that provide a signal of improved quality to specially designed receivers and a signal of usual quality to conventional receivers without alteration.

BACKGROUND OF THE INVENTION

It has long been recognized that the next evolutionary objective of televsion would be to provide high-definition television pictures to households throughout the United States. Two basic approaches have been put forward for achieving this next objective. The first approach is to depart from the present National Television System Committee standards (NTSC) and to utilize a new transmission protocol for providing high-definition television. The second approach is to provide high-definition television which could be received as a conventional television picture by conventional television receivers operating according to the NTSC standards or which could be received as a high-definition television picture by newly designed receivers without requiring prohibitively large amounts of bandwidth.

The article entitled "Transmission Primaries and Signal Forms" by T. Fugio and K. Kupota, NHK TECHNICAL MONOGRAPH, No. 32, June 1982, notes that two different signal forms have been proposed for high-definition television signal if the first approach is to be used. One is a composite system in which the transmission of the luminance and chrominance signals are frequency-division multiplexed in their spatial and temporal frequency domains as in conventional television signals and a second system in which the luminance and chrominance information is time-division multiplexed every one or two line scan periods.

A system using the second approach is disclosed in my earlier filed application, Ser. No. 462,065. In that system, one TV channel carries the conventional TV signal while high-frequency luminance and high-frequency chrominance information are provided for in a second TV channel. The baseband signal containing the high-frequency components is derived from the lower sideband output of a product modulator whose inputs are taken from an anti-alias filtered source (camera) of wideband luminance information and a local oscillator whose frequency is a multiple of the conventional chrominance subcarrier frequency embedded in the conventional baseband signal for the other channel. The band-limited portions of the high-frequency chrominance information are multiplexed between alternate horizontal lines. Since only half of the necessary chrominance information is being transmitted to the television receiver, the latter must store and reuse the chrominance information for each horizontal line displayed. The storage and reuse of half of the chrominance information for each horizontal line reduces the vertical chrominance resolution. Whereas for many applications this level of vertical chrominance resolution is not objectionable, certain applications can be enhanced by additional vertical chrominance resolution.

The ratio of chrominance information to the luminance information has been analyzed by many commentators. For example, the experimental work described in the book *Principles of Color Television*, McIlwain and Dean, John Wiley and Son, 1956, pages 81 to 95, indicates that the ratio of luminance to color should be 4 to 1. The article "Worldwide Color Television Standards—Similarities and Differences", Prichard and Gibson, *Color Television*, IEEE Press, 1983, gives the ratio of luminance to color for the PAL (Phase Alternation Line) and for only the Q signal of NTSC television systems as 5.5 to 1 and 8.4 to 1, respectively.

In light of the foregoing, it can be seen that there exists a need in the encoding and decoding of high-definition TV signals to provide a luminance to chrominance information ratio of approximately 4 to 1.

SUMMARY OF THE INVENTION

In accordance with the principles of my invention, as incorporated in an illustrative method and structural embodiment, high definition television picture signals with improved chrominance information are provided which can be received at ordinary resolution on conventional, unmodified television sets and which can be received on modified receivers without the need for more than twice the bandwidth of the conventional broadcast channel. My invention illustratively provides a luminance to chrominance information ratio of approximately 7.5 to 2 for the high-frequency TV signals.

In the illustrative embodiment, which is based on the NTSC system of 80 li nes per megahertz (MHz) of horizontal bandwidth, a horizontal resolution equivalent to 600 lines is obtained starting with a source capable of providing a baseband luminance signal having a bandwidth of 7.5 MHz instead of the conventional 4.2 MHz bandwidth. Such a source may comprise a higher resolution camera that scans at twice the standard line rate and have a resolution that is at least double the standard in the horizontal dimension and approximately double in the vertical dimension, because that source uses twice the number of scan lines as the conventional camera. The higher resolution signal, advantageously subjected to anti-alias filtering to improve vertical resolution, is then applied to a YIQ matrix capable of handling the broadband signal. Lower portions of the baseband chrominance signal (I and Q), are equivalent to those employed in standard TV, (illustratively extending from 0 to 0.5 MHz) are delivered to a conventional (illustratively, NTSC) encoder to provide the conventional baseband video signal which is transmitted in a conventional broadcast channel to a conventional TV receiver. A departure in the art is that the upper portions (I' and Q') of the increased bandwidth baseband chrominance signal are encoded as two single sideband signals.

Another departure in the art is illustratively achieved by having the high-frequency chrominance information first filtered from the high-definition chrominance information, and then, encoding the high-frequency chrominance information into two double sideband signals. A high-pass filter circuit is responsive to the double sideband signals to suppress the lower sideband signals for generating only the upper two sideband signals which represent the high-frequency chrominance information. The two single sideband signals are then added into another TV channel along with high-frequency luminance information for transmission to the television receiver.

My invention is further characterized by having, in addition to the two single sideband signals, a tone burst signal, defining the phase of the carrier signal, gated into the other channel during the vertical retrace interval. This tone burst signal is used at the high-definition television receiver to recreate the frequency and the phase of the carrier signal. The recreated carrier signal is used to recover the chrominance information at the receiver from the two single sideband signals which are in quadrature with each other. One single sideband signal conveys the I' chrominance information and the other single sideband signal conveys the Q' chrominance information.

When these two channels are received by a conventional receiver, the luminance and chrominance signals of the conventional broadcast channel are detected in a conventional manner and displayed on the conventional television receiver. Advantageously, a receiver designed in accordance with my invention also detects the conventional broadcast channel, however, the chrominance information in the upper channel is decoded by first synthesizing the two suppressed lower sideband signals from the transmitted single sideband signals. Once the high-frequency chrominance information has been decoded, it is then added to the conventional chrominance information for display by the television receiver.

Advantageously, the tone burst signal defining the phase of the carrier signal is used to adjust a receiver oscillator which generates the frequency necessary to synthesize/recreate the suppressed single sideband signals from the transmitted single sideband signals. This recreation of the single sideband signals is done by multiplying the transmitted single sideband signals by twice the carrier frequency which produces sum-difference signal. The difference portion of the sum-difference signal represents the suppressed single sideband signals. By adding the difference signal to the transmitted single sideband signals and using a quadrature detection circuit, the high-frequency chrominance information is decoded from the transmitted single sideband signals.

The novel method is provided for encoding high-definition chrominance information from a high-definition video camera into conventional chrominance information communicated in one TV channel and high-frequency chrominance and luminance information communicated in a second TV channel. The steps involve encoding the high-frequency chrominance information into two double sideband signals, suppressing the lower sideband signals, and adding the remaining two single sideband signals into the second channel before transmission to TV receivers. The steps further involve transmitting a tone burst signal during the vertical retrace interval of the second channel for recreating the carrier frequency for the single sideband signals at the receivers.

At the receivers, the method provides for decoding the high-frequency chrominance information from the second channel by the following steps: synthesizing, or processing, the two suppressed sideband signals from the transmitted single sideband signals and detecting the high-frequency chrominance information from the suppressed sideband signals and the two single sideband signals.

My invention particularly pertains to high-definition signal encoding and decoding circuitry illustratively embodied in video signal processing, or transmitting, locations and in TV receivers for high-definition picture display.

BRIEF DESCRIPTION OF THE DRAWING

In general, system elements, when first introduced on a figure, are each designated with a number that uses the figure number as the most significant digits of the element number.

GENERAL DESCRIPTION

Figure 1:
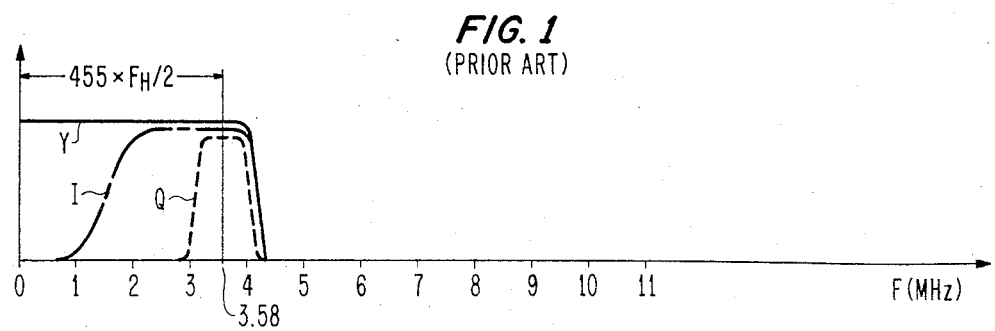
FIG. 1 shows the amplitude-frequency characteristics of the conventional baseband video signal.

FIG. 1 shows the nominal baseband amplitude-frequency characteristics of the video signal at the transmitter in the conventional NTSC system. The frequency of the chrominance subcarrier, $F_{sc}$, is displaced by the 455th harmonic of half the horizontal line-scanning frequency $F_H$ from the origin. This relationship was chosen to take advantage of the fact that the luminance spectra, Y, is actually not continuous (as shown) but exists as a multiplicity of groups of signals (not shown) centered about harmonics of the line-scanning frequency, $F_H$. The chrominance subcarrier $F_{sc}$ is set at a frequency which is an odd harmonic of half the line scanning frequency, so as to lie in a valley between two of such signal groups.

Figure 2:
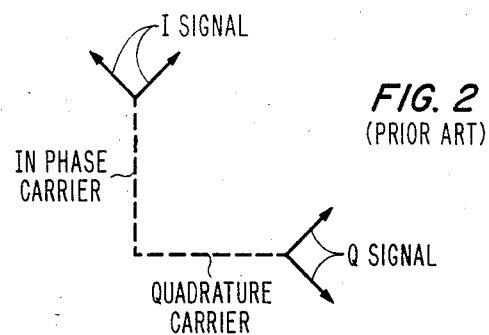
FIG. 2 shows the phasor representation of the chrominance information of the conventional baseband video signal of FIG. 1.

The chrominance subcarrier $F_{sc}$ is conventionally quadrature amplitude modulated by two chroma signals designated I and Q in FIG. 1. The Q-chroma signal reproduces colors from yellow-green to purple, while the I-chroma signal transmits hues ranging from bluish-green (cyan) to orange. The I-chroma signal contains both double sideband and single sideband portions. The double sideband portion extends 0.5 MHz on either side of the in-phase chrominance subcarrier. FIG. 2 shows in phasor representation the double sideband portion of the I-chroma signal with the subcarrier suppressed. The suppressed subcarrier is shown by dotted lines. The single sideband portion extends from 0.5 to 1.5 MHz below the in-phase chrominance subcarrier. The narrow band I-chroma signal is double sidebanded, extending 0.5 MHz either side of the quadrature chrominance subcarrier. FIG. 2 also shows in phasor representation the double sideband portion of the I-chroma signal with the subcarrier suppressed. The suppressed subcarrier is shown by dotted lines. When the signals illustrated in FIG. 2 are decoded by a contemporary TV receiver, the receiver must first recreate the suppressed subcarrier and then the receiver can recover the I-chroma and Q-chroma signals by using standard synchronous detection techniques. In order, to recreate the subcarrier, the receiver must have a local oscillator whose output frequency and phase are equal to the subcarrier frequency and phase. The local oscillator frequency is maintained in synchronous operation with subcarrier frequency by transmission of subcarrier frequency information by the transmitter to the receiver during each horizontal retrace interval.

While FIG. 1 shows the nominal baseband amplitude-frequency characteristic at the transmitter, many contemporary TV receivers do not use the full bandwidth of the I-chroma spectrum and instead confine their demodulation to hardly more than 1 MHz bandwidth encompassing the double-sideband portions of the I and Q signals.

Figure 3:
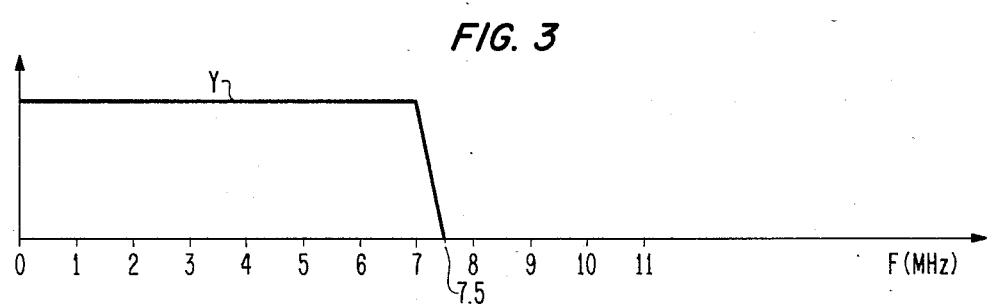
FIG. 3 shows the baseband amplitude-frequency characteristic of a wideband video source.

In FIG. 3, the baseband amplitude-frequency characteristic of a wideband video source having an illustrative luminance bandwidth of 7.5 MHz (adequate to provide a horizontal resolution of 600 lines) is shown. This broadened baseband source is assumed to be provided by improved camera technology which is described in greater detail with respect to FIG. 11. The required bandwidth is determined by the degree of improved horizontal resolution desired. Resolution is usually expressed in terms of vertical resolution and horizontal resolution. The vertical resolution tells the number of horizontal lines alternating between black and white that can be resolved in the TV image. The horizontal resolution of a system can be expressed in terms of (vertical) lines that are of the same width as the horizontal lines used to determine the vertical resolution. Since a cycle of horizontal bandwidth (half the horizontal line white, half black) contains the information equivalent of two vertical lines, the width of the lines must be adjusted to be the same as for vertical resolution taking the 4 to 3 aspect ratio into account. The horizontal resolution per unit of video bandwidth is, therefore, determined by multiplying the effective horizontal line time by two and dividing by the aspect ratio. In the NTSC system, the effective horizontal line time is 53.5 micro seconds and the aspect ratio of 4/3. Accordingly, the horizontal resolution of the NTSC system may be expressed as approximately 80 lines/MHz. Most NTSC receivers have about 3 MHz of bandwidth that results in 240 lines of resolution. The 7.5 MHz source bandwidth will permit 600 lines of horizontal resolution to be achieved.

Figure 4:
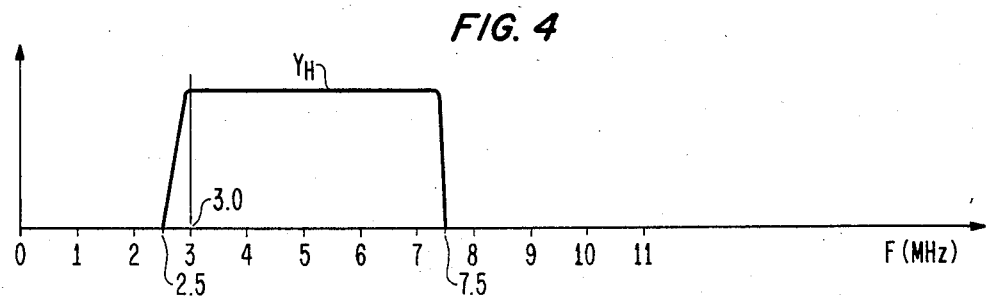
FIG. 4 shows the result of high-pass filtering the amplitude-frequency characteristic of FIG. 3.
Figure 5:
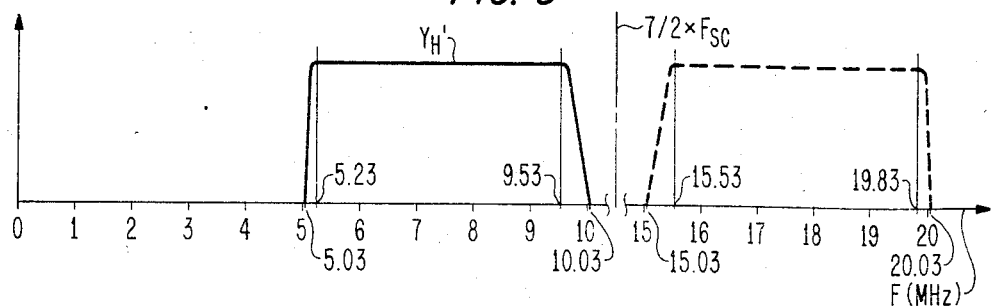
FIG. 5 shows the two sideband signals produced by modulating the signal of FIG. 4.
Figure 6:
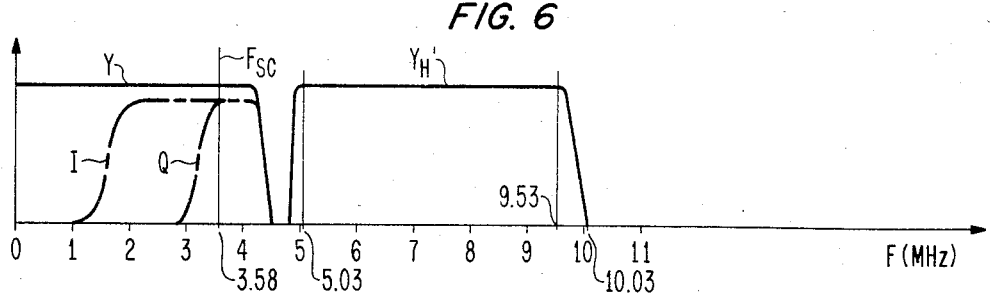
FIG. 6 shows a composite baseband amplitude-frequency characteristic containing the conventional (NTSC) portion of FIG. 1 and the lower sideband portion of FIG. 5.

When the wideband luminance source signal of FIG. 3 is presented both to a conventional (NTSC) encoder and to a high-pass filter, the NTSC encoder accepts the lower 4.2 MHz of the 7.5 MHz luminance signal as shown in FIG. 1, and the high-pass filter, having a cut-off frequency of approximately 3 MHz presents a luminance output, $Y_H$ shown in FIG. 4. The luminance output $Y_H$ is delivered to a modulator, advantageously of the "product" type having a local oscillator whose frequency is set at 3.5 times that of the chrominance subcarrier $F_{sc}$ embedded in the NTSC portion of FIG. 1. The modulator output contains the upper and lower sideband signals shown in FIG. 5. The upper sideband of FIG. 5 is discarded and the lower sideband is added to the conventional NTSC portion to yield the composite baseband amplitude-frequency characteristics shown in FIG. 6.

Figure 10:
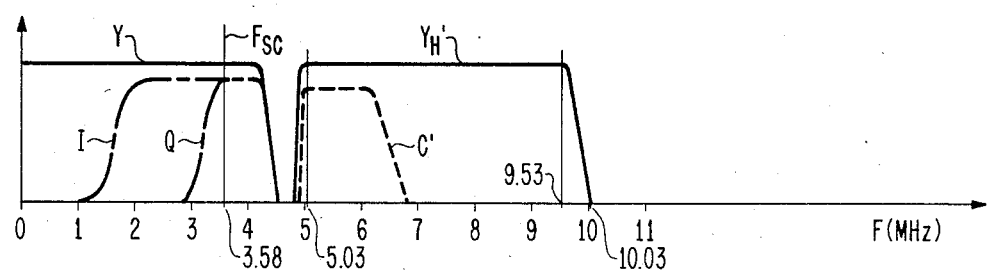
FIG. 10 shows the composite baseband amplitude-frequency characteristic including the single sideband high-frequency chrominance signals.

In addition to the conventional NTSC chrominance information illustrated in FIG. 10, chrominance information is also transmitted in the $Y_H'$ portion of the composite baseband amplitude-frequency characteristics shown in FIG. 10. The additional chrominance information which comprises I' and Q' is in the frequency spectrum between 0.5 MHz to 2 MHz as received from a high definition TV camera. Both I' and Q' are simultaneously transmitted as single sideband (SSB) signals referred to as C'. In order to be able to separate the Q' and I' signals at the receiver, the two chroma signals are modulated as double sideband suppressed carrier (DSBSC) in quadrature (QDSBSC). Then, the lower sideband signal of each of the chroma signals is then suppressed from the QDSBSC signal before transmission. At the receiver, a decoder utilizing a local oscillator which approximates not only the frequency but also has the correct phase relationship with the subcarrier is used to create the DSBSC encoded I' and Q' signals. First, the decoder recreates the missing lower sideband signals and then combines this lower sideband signals with the upper sideband signals for both the I' and Q' signals. This process recreates the DSBSC signals. After creation of the DSBSC signals, the decoder uses a synchronous detector to separate the Q' and I' signals using well-known quadrature detection circuitry.

Figure 7:
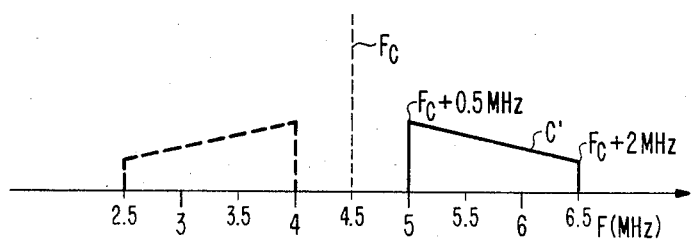
FIG. 7 illustrates the frequency spectrum of a single sideband modulated I' and Q' chrominance information with the suppressed carrier and lower sideband signals illustrated by dash lines.
Figure 8:
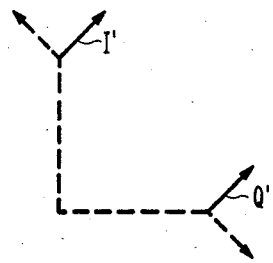
FIG. 8 is a phasor representation of the single sideband signals of FIG. 7.

FIG. 7 illustrates the frequency spectrum occupied by the single sideband signals of I' and Q' where an illustrative subcarrier frequency of 4.5 MHz is utilized for illustration purposes as the subcarrier and the suppressed lower single sideband signals are shown as dotted lines. FIG. 8 illustrates the phasor representation of the single sideband signals which are transmitted to the receiver.

Figure 9:
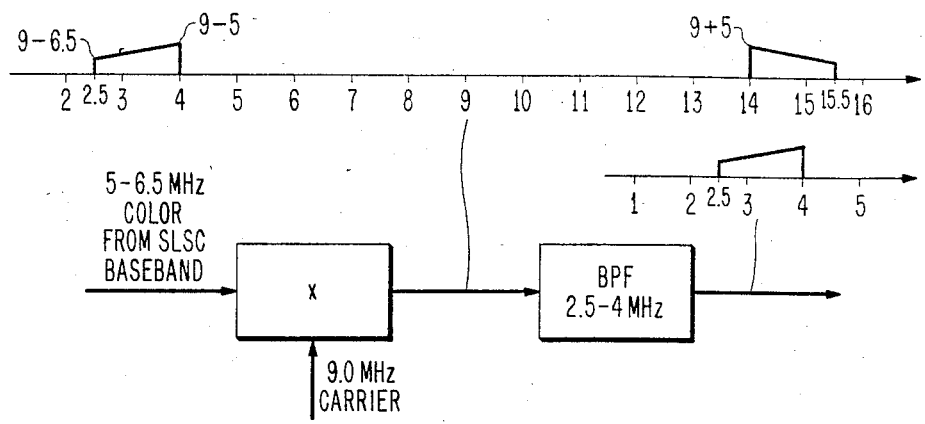
FIG. 9 is a block diagram illustrating the functional operations which must be performed by a television receiver on the single sideband signals of FIG. 7 to recreate the lower sideband signals so that a synchronous detector can be used to detect the Q' and I' signals.

FIG. 9 illustrates functionally the operations performed by the TV receiver on the I' and Q' signals received as SSB signals. The received chroma signals are first multiplied by illustratively 9 MHz which is twice the subcarrier frequency to produce a sum-difference output. The difference portion of the output represents the missing lower sideband signals. This output is subsequently put through a bandpass filter having a filter frequency of 2.5 MHz to 4 MHz which produces the missing lower sideband signals. The upper and lower sideband signals are then combined and utilized in a synchronous detector again using the recreated subcarrier frequency in the TV receiver to detect the Q' and I' signals. Once the Q' and I' signals are detected, they are then combined with the Q and I signals from the NTSC decoder.

The subcarrier frequency for Q' and I' is chosen to be a specific multiple of one quarter of the horizontal frequency and can be synthesized in the receiver. The proper phase information for the subcarrier is transmitted to the receiver during the vertical retrace interval.

DETAILED DESCRIPTION

Figure 11:
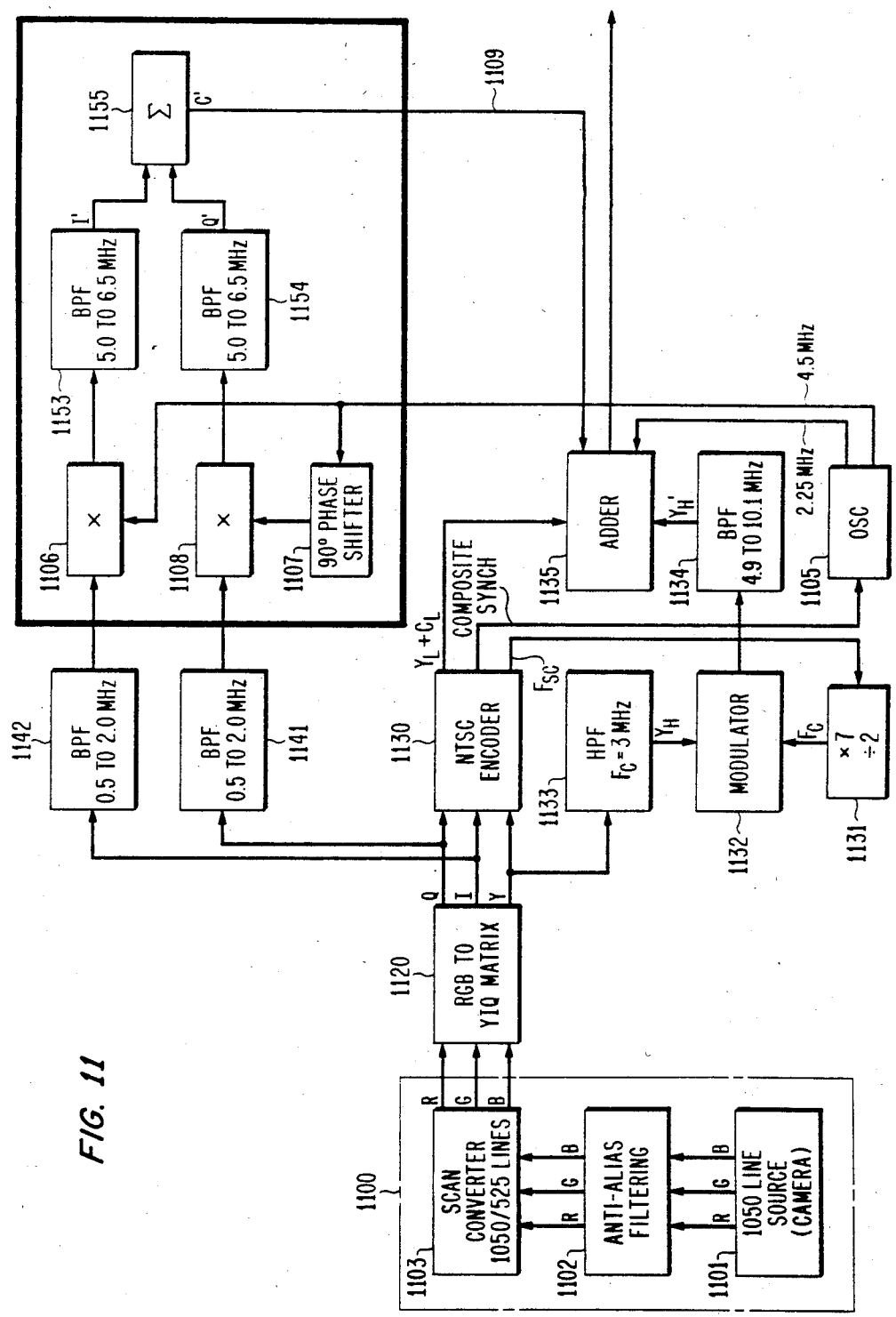
FIG. 11 is a block diagram of the high definition encoder of my invention.

Referring now to FIG. 11, a block diagram of the enhanced resolution TV encoder of my invention will be described. The increased bandwidth baseband signal of FIG. 3 is provided by circuit 1100. Circuit 1100 advantageously may be of the type described in the article "Concepts For A Compatible HIFI-Television System" by B. Wendland in *NTG-Fachber*, (Germany), Vol. 7, September, 1980, at pp. 407–416. That article described an improved video source camera 1101 capable of providing an output having more than the conventional number of scanning lines. Illustratively, a camera 1101 capable of functioning as a 1150 line source of wideband red, green and blue signals, R, G, B, is provided. The wideband R, G, B signals from camera 1101 are then subjected to anti-alias filtering by circuit 1102 to remove frequency components above the Nyquist rate.

Figure 12:
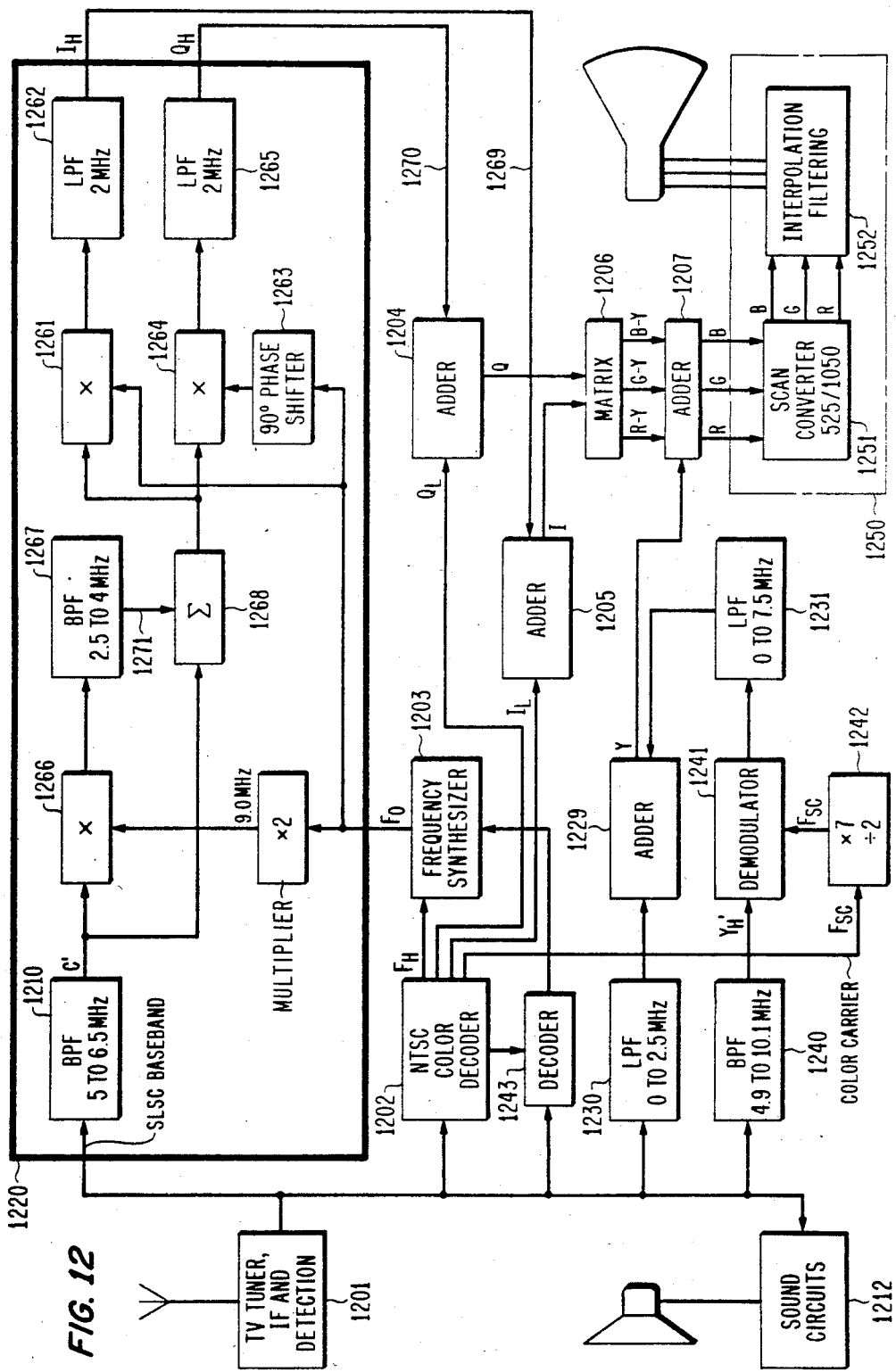
FIG. 12 is a block diagram of the high definition decoder of my invention.

Because the scanning process that changes the image into an electrical signal in the camera and then reassembles the image on the picture tube is really a sampling process, the vertical resolution is usually determined by reducing the effective number of scan lines (the total number less the number of lines in the vertical blanking interval) by the "Kell factor" of 0.6 to 0.7. Vertical filtering of the camera/source signal, however, reduces the effects of aliasing and provides a Kell factor approaching unity so that a vertical resolution approaching 483 lines, (525−2×21) is achieved. The point spread function (PSF) of the camera and the display are analogous to the impulse response in linear circuit theory and are usually adjusted by shaping the electron beam. However, a narrow PSF in the vertical direction means a wide frequency spectrum and aliasing, and a wide PSF means overlapping of adjacent lines and low-pass filtering in the vertical direction (defocusing). In the NTSC system, the PSF is adjusted to compromise between aliasing and defocusing. In accordance with the principles of the illustrative embodiment, anti-aliasing (prefiltering) is employed in circuit 1100 of the coder apparatus of FIG. 11 and interpolation (post filtering) is employed at the corresponding circuit 1250 decoder apparatus of the receiver, (FIG. 12).

In circuit 1100, the anti-alias filtered camera signals are applied by circuit 1102 to scan converter 1103. Scan converter 1103 deletes every second line of each of the 1150 line R, G, B signals to obtain a 525 line signal for ultimate transmission that will be compatible with the baseband of existing (NTSC) television receivers. The wideband R, G, B signals at the output of scan converter 1103 are applied to the RGB-to-YIQ conversion matrix 1120. Because of the wideband input of the R, G, B signals, the luminance output Y of conversion matrix 1120 exhibits the wideband amplitude-frequency characteristics of FIG. 3.

NTSC encoder 1130 receives the Y, I, Q output of matrix 1120 and provides conventional luminance and chrominance output signals, $Y_L+C_L$, to adder 1135, a composite sync signal to circuit 1105, and the conventional NTSC chrominance subcarrier signal $F_{sc}$ to circuit 1131. In the absence of any other input, the output of adder 1135 would simply provide a conventional NTSC baseband signal to the final video modulator stage (not shown) which would radiate a signal in a designated TV channel according to the frequency of the video carrier selected. However, adder 1135 is provided with two additional inputs C' and $Y_H'$ to be described, which are transmitted by a final modulator stage (not shown) on the second of two designated TV channels. These two channels should preferably be adjacent channels to minimize the effects of weather, however, more widely separated channels may also be employed.

Circuit 1131 receives the chrominance subcarrier $F_{sc}$ and serves as a local oscillator for a modulator 1132. The frequency of the local oscillator output is advantageously chosen to be 7/2 the frequency of the chrominance subcarrier $F_{sc}$. In the NTSC system, where the baseband chrominance subcarrier is 455×FH/2, the local oscillator frequency, $F_c$, provided by circuit 1131 to modulator 1132 would be approximately 12.53 MHz. The other signal that is input to modulator 1132 is the upper portion of the wideband luminance signal, $Y_H$, that is taken from the Y signal output of matrix 1120 after being filtered by high-pass filter 1133. Filter 1133 is advantageously chosen to have a cross-over frequency of approximately 3 MHz.

The output of modulator 1132 contains the two sideband signals shown in FIG. 5. The upper sideband signal is suppressed in band-pass filter 1134 and the lower sideband signal of $Y_H'$ is passed to adder 1135. The combination in adder 1135 of the conventional signals $Y_L+C_L$ from NTSC encoder 1130 with the wideband luminance signal $Y_H'$ from filter 1134 yields a baseband output signal having the amplitude-frequency characteristic of FIG. 6. This amplitude-frequency characteristic is capable of providing a high definition image within a signal spectrum requiring not more than two conventional (6 MHz) video channels.

The definition of the high-frequency chrominance components of the video signal are enhanced in the following manner. The Q and I outputs of conversion matrix 1120 are, respectively, delivered to band-pass filters 1141 and 1142 which limit each chrominance component to a 1.5 MHz bandwidth extending from 0.5 to 2.0 MHz. The band-limited outputs of filters 1141 and 1142 are transmitted to multipliers 1108 and 1106, respectively. The output of multiplier 1106 which is transmitted to bandpass filter 1153 is identical to a double sideband spectrum as illustrated in FIG. 7 including the spectrum shown in dash lines. The output of multiplier 1108 is similar but is shifted 90 degrees in phase because the 4.5 MHz signal first goes through phase shifter 1107. The two bandpass filters 1153 and 1154 suppress the lower sideband signals before transmitting the I' and Q', respectively, signals to summer 1155. The output of summer 1155 which is transmitted via conductor 1109 to adder 1135 is represented in phasor form in FIG. 8. The signal transmitted on conductor 1109 is only the upper sideband signals representing I' and Q'. Since the other inputs of adder 1135 are the conventional NTSC baseband signals and the high frequency luminance, $Y_H'$, the output of adder 1135 provides the composite baseband signal of FIG. 10. Compatibility with existing receivers is immediately apparent because the lower portion of the composite signal (FIG. 10) may be decoded by conventional NTSC receiver circuitry.

Oscillator 1105 supplies a tone burst of 2.25 MHz to adder 1135 during each vertical interval in response to a signal from encoder 1130 for use as a phase reference at the receiver. Exactly half of the 4.5 MHz frequency is illustratively chosen so that the original 4.5 MHz can easily be recreated by a simple well-known frequency multiplied by two circuit similar to how the 38 KHz reference is presently regenerated for stereo FM from a 19 KHz pilot.

A decoder for receiving the signal shown in FIG. 10 is illustrated in FIG. 12. RF tuner, video detector and IF stage 1201 receives the incoming TV signal, i.e., the two TV channels containing the broadband luminance and chrominance information heretofore described. Accordingly, stage 1201 may contain either a broadband RF tuner capable of receiving two adjacent TV channels or separate RF tuners each tuned to a respective channel. In either event, the output of stage 1201 provides the baseband amplitude-frequency characteristic of FIG. 10. Stage 1201 is coupled at its output to circuits 1202, 1210, 1212, 1230, 1240, and 1243.

NTSC color decoder 1202 receives the broadband signal of FIG. 10 from stage 1201 and at its output provides the conventional (narrowband) Q and I chrominance signals designated, $Q_L$ and $I_L$ to adders 1204 and 1205, respectively. Adders 1204 and 1205 combine the conventional Q and I chrominance signal with the high frequency chrominance signals that is derived from stage 1201 by subcircuit 1220. Matrix 1206 is responsive to the I and Q signals from adder 1205 and 1204, respectively, to produce the R-Y, G-Y, B-Y signals that are transmitted to adder 1207.

Bandpass filter 1210 is responsive to the output of stage 1201 to transmit only the C' information to multiplier 1266 and adder 1268. Multiplier 1266 and bandpass filter 1267 are responsive to the C' signal to transmit the two missing lower sideband signals for the I' and Q' signals as illustrated by FIG. 9 and indicated by dash lines in FIG. 10. Multiplier 1266 forms the sum difference output shown in FIG. 9 and bandpass filter 1267 suppresses the sum portion leaving only the difference portion which is the two missing lower sideband signals. Summation circuit 1268 is responsive to the lower sideband signals being received via conductor 1271 and the upper sideband signals which are present in the C' signal from bandpass filter 1210 to recreate the double sideband signal with suppressed carrier which circuit 1268 subsequently transmits to multipliers 1261 and 1264. Blocks 1261 through 1265 form a well known synchronous quadrature detector and recover the I' and Q' signals. The I' signal is transmitted via conductor 1269 to adder 1205 and the Q' signal is transmitted via conductor 1270 to adder 1204.

Decoder 1243 is responsive to the tone burst which was introduced into the transmitted signal by oscillator 1105 to provide phase information to frequency synthesizer 1203. The latter is responsive to that phase information to properly maintain the phase of its output signal.

A full bandwidth luminance input Y, to adder 1207 is provided from adder 1229 which receives as inputs the outputs of low pass filters 1230 and 1231 as shown in FIG. 12. Filter 1230 constrains the composite wideband video signal provided by stage 1201 to the region 0 to 2.5 MHz. Low pass filter 1231 delivers the lower sideband output, 2.5 to 7.5 MHz, provided by product demodulator 1241. Product demodulator 1241 receives a local oscillator input from circuit 1242 that is 7/2 the frequency of the color subcarrier $F_{sc}$ detected by NTSC color decoder 1202. The other input to product demodulator 1241 is the upper portion of the baseband video signal extending from approximately 4.9 to 10.1 MHz as shown in FIG. 10.

The composite high resolution R, G, and B signal provided at the output of adder 1207 is delivered to output circuit 1250 which includes a 525-to-1050 line scan converter 1251 and an interpolating filter circuit 1252. The interpolated R, G, and B signals from circuit 1252 are then available to be displayed on the TV screen of the receiver.

While the illustrative embodiments of my invention have been described specifically with relation to NTSC standards and protocols, it is to be understood that principles of my invention are applicable to other standards and protocols, such as PAL. Furthermore, the circuits and amplitude characteristics which have been described are deemed to be illustrative of the principles of my invention. Numerous modifications may be made by those skilled in the art without departing from the spirit and scope of my invention.

What is claimed is:

1. A system for decoding high-definition chrominance information of a high-definition baseband video signal having a first baseband signal including low-frequency chrominance information and second baseband signal including high-frequency chrominance information encoded as a plurality of single sideband signals, said system comprises
    means for decoding said low-frequency chrominance information;
    means for filtering said single sideband signals from said high-definition baseband video signal;
    means for synthesizing a plurality of suppressed sideband signals from the filtered single sideband signals;
    means for detecting said high-frequency chrominance information from said suppressed sideband signals and said filtered single sideband signals; and
    means for adding the decoded low-frequency chrominance information and the detected high-frequency chrominance information to produce said high-definition chrominance information.

2. The system of claim 1 wherein said high-definition baseband video signal further comprises a tone burst signal defining the phase of a carrier signal used to encode said single sideband signals; and
    said synthesizing means further comprises means responsive to said tone burst signal for generating the suppressed carrier signal associated with said single sideband signals to synthesize said suppressed sideband signals.

3. The system of claim 2 wherein said synthesizing means further comprises means for multiplying said suppressed carrier signal and said filtered single sideband signals to generate a sum-difference signal of said suppressed carrier signal and said filtered single sideband signals;
    means for suppressing the sum portion of said sum-difference signal to generate said suppressed sideband signals; and
    means for adding said suppressed sideband signals and said filtered single sideband signals to generate a plurality of double sideband signals having said high-frequency chrominance information.

4. The system of claim 3 wherein said detecting means comprises means for multiplying said double sideband signals with a multiple of said suppressed carrier signal to extract a portion of said high-frequency chrominance information;
    means responsive to said suppressed carrier signal for generating a phase shifted carrier signal; and
    means for multiplying said double sideband signals with a multiple of said phase shifted carrier signal to extract another portion of said high-frequency chrominance information.

5. A system for encoding high-definition chrominance information from a high-definition video source into low-frequency chrominance information encoded into a first baseband signal and high-frequency chrominance information encoded into second baseband signal for transmission, said system comprises
    means for encoding said low-frequency chrominance information into said first baseband signal;
    means for filtering said high-frequency chrominance information from said high-definition chrominance information;
    means for encoding the filtered high-frequency chrominance information into plurality of double sideband signals with a carrier signal;
    means for suppressing one signal of each of said double sideband signals to generate single sideband signals representing said high-frequency chrominance information; and
    means for adding the generated single sideband signals to said second baseband signal for transmission with said first baseband signal.

6. The system of claim 5 further comprising means for gating a tone burst signal defining the phase of said carrier signal into said second baseband signal during the vertical retrace interval of said second baseband signal.

7. The system of claim 6 wherein said high-frequency chrominance information comprises first and second chrominance component signals;
    said high-frequency chrominance encoding means comprising means for multiplying said first component signal with said carrier signal to generate one of said double sideband signals;
    means for phase shifting said carrier signal to generate a phase shifted carrier signal; and
    means for multiplying said second chrominance component signal with said phase shifted carrier signal to generate another one of said double sideband signals.

8. A method of decoding high-definition chrominance information of a high-definition baseband video signal from a first baseband signal including low-frequency chrominance information and second baseband signal including high-frequency chrominance information encoded as a plurality of single sideband signals, comprising the steps of:
    decoding said low-frequency chrominance information;
    filtering said single sideband signals from said high-definition baseband video signal;
    synthesizing a plurality of suppressed sideband signals from the filtered single sideband signals;
    detecting said high-frequency chrominance information from said suppressed sideband signals and said filtered single sideband signals; and
    adding the decoded low-frequency chrominance information and the detected high-frequency chrominance information to produce said high-definition chrominance information.

9. The method of claim 8 wherein said high-definition baseband video signal further comprises a tone burst signal defining the phase of the carrier signal used to encode said single sideband signals and said synthesizing step further comprises the step of generating the suppressed carrier signal associated with said single sideband signals in response to said tone burst signal to synthesize said suppressed sideband signals.

10. The method of claim 9 wherein said synthesizing step further comprises the steps of
    multiplying said suppressed carrier signal and said filtered single sideband signals to generate a sum-difference signal of said suppressed carrier signal and said filtered single sideband signals;
    suppressing the sum portion of said sum-differencesignal to generate said suppressed sideband signals; and
    adding said suppressed sideband signals and said filtered single sideband signals to generate plurality of double sideband signals having said high-frequency chrominance information.

11. The method of claim 10 wherein said detecting step further comprises the steps of multiplying said double sideband signals with a multiple of said suppressed carrier signal to extract a portion of said high-frequency chrominance information;
    generating a phase shifted carrier signal in response to said suppressed carrier signal; and
    multiplying said double sideband signals with a multiple of said phase shifted carrier signal to extract another portion of said high-frequency chrominance information.

12. A method of encoding high-definition chrominance information from a high-definition video source into low-frequency chrominance information encoded into a first baseband signal and into high-frequency chrominance information encoded into second baseband signal for transmission, comprising the steps of:
    encoding said low-frequency chrominance information into said first baseband signal;
    filtering said high-definition chrominance information to produce said high-frequency chrominance information;
    encoding the filtered high-frequency chrominance information into a plurality of double sideband signals with a carrier signal;
    suppressing one signal of each of said double sideband signals and thereby generating single sideband signals representing said filtered high-frequency chrominance information; and
    adding the generated single sideband signals to said second baseband signal for transmission with said first baseband signal.

13. The method of claim 12 further comprising the step of gating a tone burst signal defining the phase of said carrier signal into said second baseband signal during the vertical retrace interval of said second baseband signal.

14. The method of claim 13 wherein said high-frequency chrominance information comprises first and second chrominance component signals and said high-frequency encoding step comprises the steps of:
    multiplying said first component signal with said carrier signal to produce one of said double sideband signals;
    generating a phase shifted carrier signal from said carrier signal; and multiplying said second chrominance signal with said phase shifted carrier signal to produce another one of said double sideband signals.

15. A system for decoding high-definition chrominance information of a high-definition baseband video signal having a first baseband signal including low-frequency chrominance information and second baseband signal including high-frequency chrominance information encoded as a plurality of single sideband signals and a tone burst signal defining the phase of a carrier signal used to encode said single sideband signals, said system comprises means responsive to said tone burst signal for generating the suppressed carrier signal associated with said single sideband signals to synthesize a plurality of suppressed sideband signals;

means for multiplying said suppressed carrier signal and said single sideband signals to generate a sum-difference signal of said suppressed carrier signal and said single sideband signals;

means for suppressing the sum portion of said sum-difference signal to produce said suppressed sideband signals;

means for adding said suppressed sideband signals and said single sideband signals to generate two double sideband signals having said high-frequency chrominance information;

means for multiplying said double sideband signals with a multiple of said suppressed carrier signal to extract a portion of said high-frequency chrominance information;

means responsive to said suppressed carrier signal for generating a phase shifted carrier signal; and means for multiplying said double sideband signals with a multiple of said phase shifted carrier signal to extract another portion of said high-frequency chrominance information.

16. A system for transmission of high-definition video information, said system comprising means for generating said high-definition video information having low-frequency luminance and chrominance information and high-frequency luminance and chrominance information;

means responsive to said high-definition video information for encoding said low frequency luminance and chrominance information;

means responsive to said high-definition video information for encoding said high-frequency luminance information into a modulated signal;

means for encoding said high-frequency chrominance information into a plurality of double sideband signals with a carrier signal;

means for suppressing one signal of each of said double sideband signals to generate single sideband signals representing said high-frequency chrominance information; and means for adding said modulated signal and said single sideband signals together for transmission with the encoded low-frequency luminance and chrominance information.

17. The system of claim 16 wherein said high-frequency luminance encoding means comprises means for modulating said high-frequency luminance information with a signal having a frequency that is a multiple of the frequency of the chrominance subcarrier used to encode said low-frequency chrominance information to produce a sideband signal having spectra that do not overlap the spectra of said encoded low-frequency luminance and chrominance information.

18. A system for displaying high-definition video information of a high-definition baseband video signal having a first baseband signal including low-frequency luminance and chrominance information and second baseband signal including high-frequency luminance encoded as a luminance single sideband signal and high-frequency chrominance information encoded as a plurality of chrominance single sideband signals and a tone burst signal defining the phase of a carrier signal used to encode said single sideband signals, said system comprises means responsive to said tone burst signal and said chrominance single sideband signals of said second baseband signal for producing said high-frequency chrominance information;

means responsive to said luminance single sideband signal of said second baseband signal for decoding said high-frequency luminance information;

means responsive said first baseband signal for generating said low-frequency luminance information;

means responsive to said first baseband signal for recreating said low-frequency chrominance information;

means for adding the produced chrominance information and the recreated chrominance information to produce a composite chrominance signal;

means for adding the decoded luminance information and generated luminance information to produce a composite luminance signal; and means for displaying said composite chrominance signal and said composite luminance signal.

19. The system of claim 18 wherein said producing means comprises:

means responsive to said tone burst signal for generating the suppressed carrier signal associated with said chrominance single sideband signals to synthesize a plurality of suppressed sideband signals;

means for multiplying said suppressed carrier signal and said chrominance single sideband signals to generate a sum-difference signal of said suppressed carrier signal and said chrominance single sideband signals;

means for suppressing the sum portion of said sum-difference signal to produce said suppressed sideband signals;

means for adding said suppressed sideband signals and said chrominance single sideband signals to generate two double sideband signals having said high-frequency chrominance information;

means for multiplying said double sideband signals with a multiple of said supprressed carrier signal to extract a portion of said high-frequency chrominance information;

means responsive to said suppressed carrier signal for generating a phase shifted carrier signal; and means for multiplying said double sideband signals with a multiple of said phase shifted carrier signal to extract another portion of said high-frequency chrominance information.

* * * * *

UNITED STATES PATENT AND TRADEMARK OFFICE
CERTIFICATE OF CORRECTION

PATENT NO. : 4,589,011
DATED : May 13, 1986
INVENTOR(S) : Theodore S. Rzeszewski It is certified that error appears in the above-identified patent and that said Letters Patent is hereby corrected as shown below:

IN THE CLAIMS

Column 12, line 16, "cesignal" should be "ce signal".

Signed and Sealed this

Eighteenth Day of August, 1992

Attest:

DOUGLAS B. COMER

Attesting Officer  Acting Commissioner of Patents and Trademarks